US012267395B2

(12) United States Patent
Meade

(10) Patent No.: US 12,267,395 B2
(45) Date of Patent: **\*Apr. 1, 2025**

(54) COMMUNICATION PLATFORM SHIFTING FOR VOICE-ENABLED DEVICE

(71) Applicant: Christiana Care Health System, Inc., Wilmington, DE (US)

(72) Inventor: Jonathan Meade, Newark, DE (US)

(73) Assignee: CHRISTIANA CARE HEALTH SYSTEM, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,043

(22) Filed: Jun. 13, 2023

(65) Prior Publication Data

US 2023/0328143 A1 Oct. 12, 2023

Related U.S. Application Data

(63) Continuation of application No. 17/036,626, filed on Sep. 29, 2020, now Pat. No. 11,722,572.

(60) Provisional application No. 62/909,000, filed on Oct. 1, 2019.

(51) Int. Cl.
*H04L 67/148* (2022.01)
*H04L 51/10* (2022.01)
*H04L 67/02* (2022.01)

(52) U.S. Cl.
CPC ............ *H04L 67/148* (2013.01); *H04L 51/10* (2013.01); *H04L 67/02* (2013.01)

(58) Field of Classification Search
CPC ....... H04L 67/148; H04L 51/10; H04L 67/02; H04L 67/10; H04L 67/141; H04L 67/145; H04L 51/18
See application file for complete search history.

(56) References Cited

U.S. PATENT DOCUMENTS

| 7,624,185 | B2 | 11/2009 | Miller |
| 7,882,243 | B2 * | 2/2011 | Ivory .................... A63F 13/87 |
| | | | 709/227 |
| 8,385,903 | B2 | 2/2013 | Ghai |
| 9,641,954 | B1 | 5/2017 | Typrin |

(Continued)

FOREIGN PATENT DOCUMENTS

CA 2654538 8/2009

*Primary Examiner* — Benjamin M Thieu
(74) *Attorney, Agent, or Firm* — FisherBroyles LLP

(57) ABSTRACT

A system allowing user/system interaction sessions on voice-enabled computing devices (VECDs) to be shifted from a voice-based interface to a non-voice-based (such as a text/web-based) interface. Accordingly, easy and convenient data input, receipt and recognition is provided in a manner that is not likely to frustrate users, that accommodates a broad range of data needs, and/or that avoids confidentiality issues associated with the use of voice input and data security issues associated with the storage of medical/health or other sensitive data. The system recognizes a platform-shifting command via a voice-based interface, gathers any required information (such as a telephone number or e-mail address) for continuing the communications session on another platform, and then sends a text/email/other message including a URL/hyperlink usable to initiate a communications session on a different communications platform and continue a voice-based interaction session on a non-voice-based communications platform.

26 Claims, 6 Drawing Sheets

(56) References Cited

U.S. PATENT DOCUMENTS

| | | | |
|---|---|---|---|
| 2002/0161896 A1* | 10/2002 | Wen | H04L 67/14 |
| | | | 709/227 |
| 2012/0096069 A1* | 4/2012 | Chan | G06F 9/4856 |
| | | | 709/203 |
| 2014/0136195 A1 | 5/2014 | Abdossalami | |
| 2014/0351370 A1* | 11/2014 | Ashley | H04L 67/148 |
| | | | 709/217 |
| 2016/0323389 A1* | 11/2016 | Miller | H04L 9/40 |
| 2019/0156818 A1 | 5/2019 | Piersol | |
| 2019/0180343 A1 | 6/2019 | Arnett | |

* cited by examiner

COMMUNICATION PLATFORM SHIFTING FOR VOICE-ENABLED DEVICE

CROSS-REFERENCE TO RELATED APPLICATION

This application is a continuation of U.S. application Ser. No. 17/036,626, filed Sep. 29, 2020, which claims the benefit of priority, under 35 U.S.C § 119 (e), of U.S. Provisional Patent Application No. 62/909,000, filed Oct. 1, 2019, the entire disclosure of each of which is hereby incorporated herein by reference.

FIELD OF THE INVENTION

The present invention relates generally to networked computing and data communications systems, and more particularly, to devices and methods for human-computer interactions, including voice-controlled/voice-enabled computing device capable of receiving input from humans in the form of speech.

DISCUSSION OF RELATED ART

There are various means for voice communication between individuals, including cell phones, voice over IP (VoIP) services, and landline phones. Homes are becoming more wired and connected with the proliferation of computing devices such as desktops, tablets, entertainment systems, and portable communication devices. As computing devices evolve, many different ways have been introduced to allow human users to interact with, and provider user input to, these devices, such as through mechanical means (e.g., keyboards, mice, etc.), touch screens, motion, and gesture. Another way to interact with computing devices is through speech.

Certain electronic devices, such as voice-enabled computing devices, are capable of receiving inputs from humans in the form of spoken words/speech. Examples of voice-enabled computing devices include Amazon Alexa-based devices, such as the Echo and Dot devices manufactured and/or sold by Amazon Technologies, Inc., the Google Home device manufactured and/or sold by Alphabet, Inc., and the Sonos One. Such voice-enabled computing devices are capable of performing various functions. For instance, an individual may speak a command to activate such a device and in response, the device may perform various functions and/or cause one or more actions to be performed. Some voice-enabled devices may also include speakers, display screens, and the like for presentation of content. Some voice-enabled devices may be implemented within a distributed system that provides these devices, as remote clients, with access to various services that are implemented largely within a distributed computing system and that are accessible via a computerized communications/data network. These network-accessible services may enable remote client devices to access or provide additional functionality or computing power not available locally on the devices.

Although voice-enable computing devices are capable of receiving and acting upon human-provided voice input, it can become cumbersome to interact with such voice-enabled devices when an extensive amount of voice input is needed, or when the input contains relatively uncommon words, such as uncommon surnames, city or town names, etc., or other words that are outside of typical voice-recognition capabilities of such voice-enabled computing systems. This often leads to repetition and/or erroneous capture of information provided as voice input, which can be frustrating to a user. Additionally, it may be undesirable to provide certain input as voice input, for example, when the human is attempting to interact with the system in a public place and does not want to speak sensitive, private or confidential information to provide voice input that could be overheard by others in proximity to the user.

Some systems, such as the Amazon Alexa, are capable of retrieving stored information (e.g., using information from a generic Amazon account profile to populate data into a "card") and using the stored information as input in conjunction with voice input. For example, the Amazon Alexa device can retrieve information from a stored user profile. However, the process for enabling such data sharing is itself cumbersome and unknown to many users, e.g., by enabling certain data sharing permissions within an associated software app (by enabling individuals for each Amazon "skill"), the data stored is limited and generally insufficient for a broad range of possible data needs, and further the repository is not or may not be secure or compliant with applicable heightened security standards, as may be required or appropriate, for example, for banking or medical/health-related information.

What is needed is a system and method that allows for easy and convenient input in a manner complementary to voice-enabled input, that is not likely to be burdensome or frustrating to users, that accommodates a broad range of data needs, and/or that avoids confidentiality issues associated with the use of voice input and the data security issues associated with the storage of banking, medical/health or other sensitive data.

SUMMARY

The present invention provides a system and method that provide a multi-platform communication session to allow for easy and convenient data input to a computerized system. More particularly, the system and method allow for shifting of communications from a voice-enabled communications platform used by a voice-enabled computing device to another communications platform that receives input other than as voice input, such as to a web-enabled communications platform. The system and method does so to allow for data input in a manner that is not likely to be burdensome or frustrating to users, that accommodates a broad range of data needs, and/or that avoids confidentiality issues associated with the use of voice input and the data security issues associated with the storage of banking, medical/health or other sensitive data.

BRIEF DESCRIPTION OF THE FIGURES

An understanding of the following description will be facilitated by reference to the attached drawings, in which.

DETAILED DESCRIPTION

The present invention provides a system and method for platform shifting for voice-enabled computing devices (VECDs) that allows a human user to start an interaction session with a system on a voice-enabled (voice-based interface) computing platform, and to continue the interaction session on a web-interface computing platform. In this manner, the present invention provides a mechanism for easy and convenient input in a manner complementary to voice-enabled input, that is not likely to be burdensome or frustrating to users, that accommodates a broad range of data needs, and/or that avoids confidentiality issues associated with the use of voice input and the data security issues associated with the storage of banking, medical/health or other sensitive data.

As will be appreciated by those skilled in the art, the VECD may be implemented as a device that includes a microphone and a speaker, and that is communicatively distinct from a user's mobile/cell phone 132, tablet computer 133*b*, desktop/personal computer 133*a*, etc. (hereinafter, Web-Enabled Device or WED), such as an Amazon Alexa-based device. The WED is web-enabled, in that it includes hardware and software for browsing and interacting with web pages via the Internet. Optionally, for example in the case of mobile/cell phones and tablet computers, the WED may also be text-enabled in that it includes hardware and software for receiving and/or sending SMS messages or similar messages (such as Apple iMessages) via a cellular carrier/phone network and/or the Internet. The WED may utilize a network-accessible (or "cloud-based") service to establish communication with a cellular carrier network to enable communication between the VECD and the WED. The devices and techniques described herein may be implemented in a variety of different architectures and contexts. One non-limiting and illustrative implementation is described below.

Figure 1:
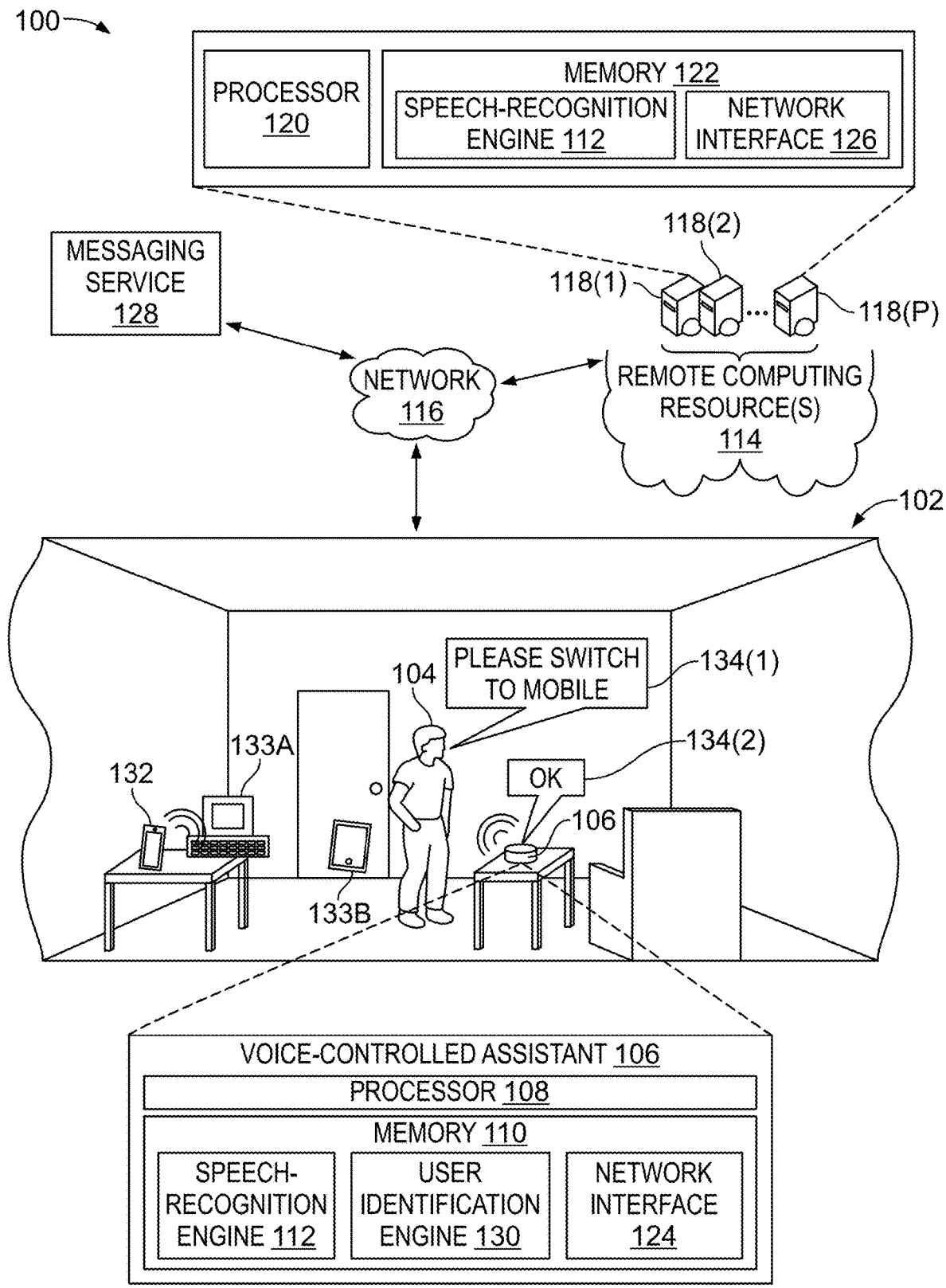
FIG. 1 shows an illustrative voice interaction computing architecture set in a home environment that is exemplary of the prior art.

FIG. 1 shows an illustrative voice interaction computing architecture 100 set in a home environment 102 that includes a user 104. The architecture 100 also includes an electronic voice-enabled computing devices VECD 106 with which the user 104 may interact. In the illustrated implementation, the VECD 106 is positioned on a within a room of the home environment 102, such as on a table, wall, ceiling, in a lamp, etc. More than one VECD 106 may be positioned in a single room, or multiple VECDs may be used to accommodate user interactions from multiple rooms.

Generally, the VECD 106 has at least one microphone and at least one speaker to facilitate audio interactions with the user 104 and/or other users. In some instances, the VECD 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary, and potentially only, mode of user interaction with the electronic VECD 106 may be through voice input and audible output. One example implementation of the VECD 106 is provided below in more detail with reference to FIG. 2.

The microphone of the VECD 106 detects audible sounds from the environment 102, such as voice sounds from the user 104. As illustrated, the VECD 106 includes a processor 108 and memory 110, which stores or otherwise has access to a speech-recognition engine 112. As used herein, a processor may include multiple processors and/or a processor having multiple cores. The speech-recognition engine 112 performs speech recognition on audio captured by the microphone, such as utterances spoken by the user 104. The VECD 106 may perform certain actions in response to recognizing different speech from the user 104. The user may speak predefined commands (e.g., "Awake"; "Sleep"), or may use a more casual conversation style when interacting with the VECD 106 (e.g., "I'd like to go to a movie. Please tell me what's playing at the local cinema.").

In some instances, the VECD 106 may operate in conjunction with or may otherwise utilize computing resources 114 that are remote from the environment 102. For instance, the VECD 106 may couple to the remote computing resources 114 over a network 116. As illustrated, the remote computing resources 114 may be implemented as one or more servers 118(1), 118(2), . . . , 118(P) and may, in some instances form a portion of a network-accessible computing platform implemented as a computing infrastructure of processors, storage, software, data access, and so forth that is maintained and accessible via a network such as the Internet. The remote computing resources 114 do not require end-user knowledge of the physical location and configuration of the system that delivers the services. Common expressions associated for these remote computing devices 114 include "on-demand computing", "software as a service (SaaS)", "platform computing", "network-accessible platform", "cloud services", "data centers", and so forth.

The servers 118(1)-(P) include a processor 120 and memory 122, which may store or otherwise have access to some or all of the components described with reference to the memory 110 of the VECD 106. For instance, the memory 122 may have access to and utilize the speech-recognition engine 112 or another speech recognition engine for receiving audio signals from the VECD 106, recognizing speech and, potentially, causing performance of an action in response. In some examples, the VECD 106 may upload audio data to the remote computing resources 114 for processing, given that the remote computing resources 114 may have a computational capacity that far exceeds the computational capacity of the VECD 106. Therefore, the VECD 106 may utilize the speech-recognition engine 112 at the remote computing resources 114 for performing relatively complex analysis on audio captured from the environment 102.

Regardless of whether the speech recognition occurs locally or remotely from the environment 102, the VECD 106 may receive vocal input from the user 104 and the VECD 106 and/or the resources 114 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, telephone communication, and so forth.

The VECD 106 and the remote computing resources 114 may communicatively couple to the network 116 via network interface 124 and network interface 126, respectively, using wired technologies (e.g., wires, USB, fiber optic cable, etc.), wireless technologies (e.g., RF, cellular, satellite, Bluetooth, etc.), or other connection technologies. The network 116 is representative of any type of communication network, including data and/or voice network, and may be implemented using wired infrastructure (e.g., cable, CATS, fiber optic cable, etc.), a wireless infrastructure (e.g., RF, cellular, microwave, satellite, Bluetooth, etc.), and/or other connection technologies.

In accordance with the present invention, at least a part of the remote computer resources 114 includes hardware and/or software for implementing particular functionality in accordance with the present invention. In part, the remote computer resources 114 implement a workflow providing functionality in accordance with the present invention. In part, this may involve particular software code and/or logic consistent with the VECD ecosystem, e.g., to implement tools of the VECD ecosystem (e.g., an Amazon Skill for an Amazon Alexa ecosystem) to provide functionality in accordance with the present invention. Additionally, the remote computer resources 114 may include additional software code and/or logic that extends beyond the functionality of the VECD ecosystem, in accordance with the present invention, and in particular, to enable a separate communications session with the user 104 via the WED, based at least in part on information gathered via the VECD via a voice-enabled communications session with the VECD, so that an information exchange session interaction initiated via a VECD session can be continued and/or completed via the WED. This may involve communication with a separate e-mail and/or web server, e.g., to cause display at the WED of a URL or similar hyperlink/link for initiating a web-based communication session with the WED. By way of further example, this may involve communication with a messaging service 128 (including appropriate conventional hardware and software), which may include, or be separately distinct from but in communication with, a cellular/mobile phone carrier network and/or an SMS/MMS or similar service to cause display at the WED of a text or similar message including a hyperlink/link for initiate a web-based communication session with the WED. In either case, this allows the user to start an information exchange session with the VECD using voice input on a voice-enabled platform, and to shift to a different, web-based platform to continue and/or complete the information exchange session via the WED using non-voice input, e.g., via a keyboard, touchscreen or other input device of the WED, and/or using data retrieval and web form-filling at the WED, and optionally, via an HTTPS protocol secure web-based communications session, using technology that is well-known in the art.

Accordingly, in addition to communicating with each other over the network 116, the VECD 106 and the computing resources 114 may also each communicate with the messaging service 128 over the network 116.

As illustrated, the memory 110 of the VECD 106 also stores or otherwise has access to a user identification engine 130, which functions to identify a user that utters an audible command.

Upon receiving audio within the environment 102, the speech-recognition engine 112 may first attempt to identify whether or not the audio contains speech, such as speech from the user 104. If so, then the speech-recognition engine 112 may perform automatic speech recognition (ASR) on the audio and may perform an action corresponding to any command from the audio. For instance, the user may speak commands indicating at the that user wishes to shift platforms, and to complete an information exchange session via the WED.

In addition, and as illustrated, the VECD 106 may output a response 134(2) after performing the speech recognition. For instance, the VECD 106 may output an indication that the VECD will comply with the request, with this indication being audible, visual, or the like. Here, for instance, the VECD 106 (as govern by commands and/or logic implemented as part of an Alexa skill or otherwise at a distinct server) audibly outputs the response 134(2), indicating that the VECD 106 will proceed as requested. As such, the speech-recognition engine 112 may identify this command and the VECD 106 will request an e-mail address and/or telephone number to be used to send a link (e.g., via an e-mail or via an SMS/MMS/text) that can be followed using the WED to initiate a web-based communication session for continuing the information exchange session.

Figure 2:
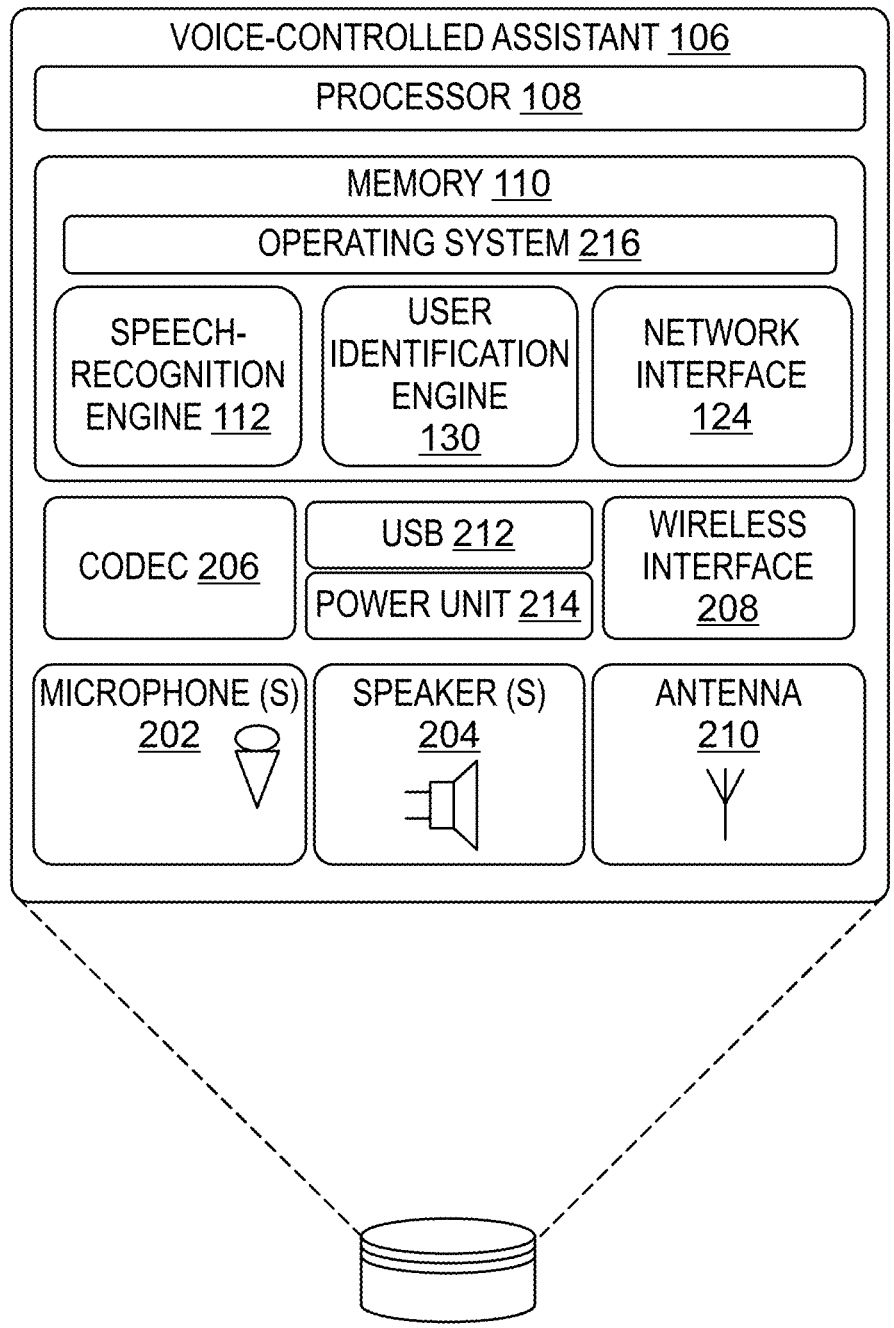
FIG. 2 shows a block diagram of selected functional components implemented in the VECD of FIG. 1.

FIG. 2 shows selected functional components of the VECD 106 in more detail. Generally, the VECD 106 may be implemented as a standalone device that is relatively simple in terms of functional capabilities with limited input/output components, memory and processing capabilities. For instance, the VECD 106 may not have a keyboard, keypad, or other form of mechanical input in some implementations, nor does it have a display or touch screen to facilitate visual presentation and user touch input. Instead, the VECD 106 may be implemented with the ability to receive and output audio, a network interface (wireless or wire-based), power, and limited processing/memory capabilities.

In the illustrated implementation, the VECD 106 includes the processor 108 and memory 110. The memory 110 may include computer-readable storage media ("CRSM"), which may be any available physical media accessible by the processor 108 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 108.

The VECD 106 includes one or more microphones 202 to receive audio input, such as user voice input, and one or more speakers 204 to output audio sounds. A codec 206 is coupled to the microphone 202 and speaker 204 to encode and/or decode the audio signals. The codec may convert audio data between analog and digital formats. A user may interact with the VECD 106 by speaking to it, and the microphone 202 captures the user speech. The codec 206 encodes the user speech and transfers that audio data to other components. The VECD 106 can communicate back to the user by emitting audible statements through the speaker 204. In this manner, the user interacts with the VECD simply through speech, without use of a keyboard or display common to other types of devices.

In the illustrated example, the VECD 106 includes a wireless interface 208 coupled to an antenna 210 to facilitate a wireless connection to a network. The wireless interface 208 may implement one or more of various wireless technologies, such as WiFi, Bluetooth, RF, and so on.

The VECD 106 may also include one or more device interfaces 212 to facilitate a wired connection to a network, or a plug-in network device that communicates with other wireless networks. The interfaces 212 may comprise a USB port and/or other forms of wired connections such as a broadband connection. A power unit 214 is further provided to distribute power to the various components on the VECD 106.

The VECD 106 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the VECD 106 may include non-input control mechanisms, such as basic volume control button(s) for increasing/decreasing volume, as well as power and reset buttons. There may also be a simple light element (e.g., LED) to indicate a state such as, for example, when power is on. But, otherwise, the VECD 106 does not use or need to use any input devices or displays in some instances.

Several modules such as instructions, datastores, and so forth may be stored within the memory 110 and configured to execute on the processor 108. An operating system module 216 is configured to manage hardware and services (e.g., wireless unit, USB, Codec) within and coupled to the VECD 106 for the benefit of other modules.

In addition, the memory 110 may include the speech-recognition engine 112, the user identification engine 130, and the network interface 124 discussed above. Also as discussed above, some or all of the engines, data stores, and components may reside additionally or alternatively at the remote computing resources 114.

Figure 3:
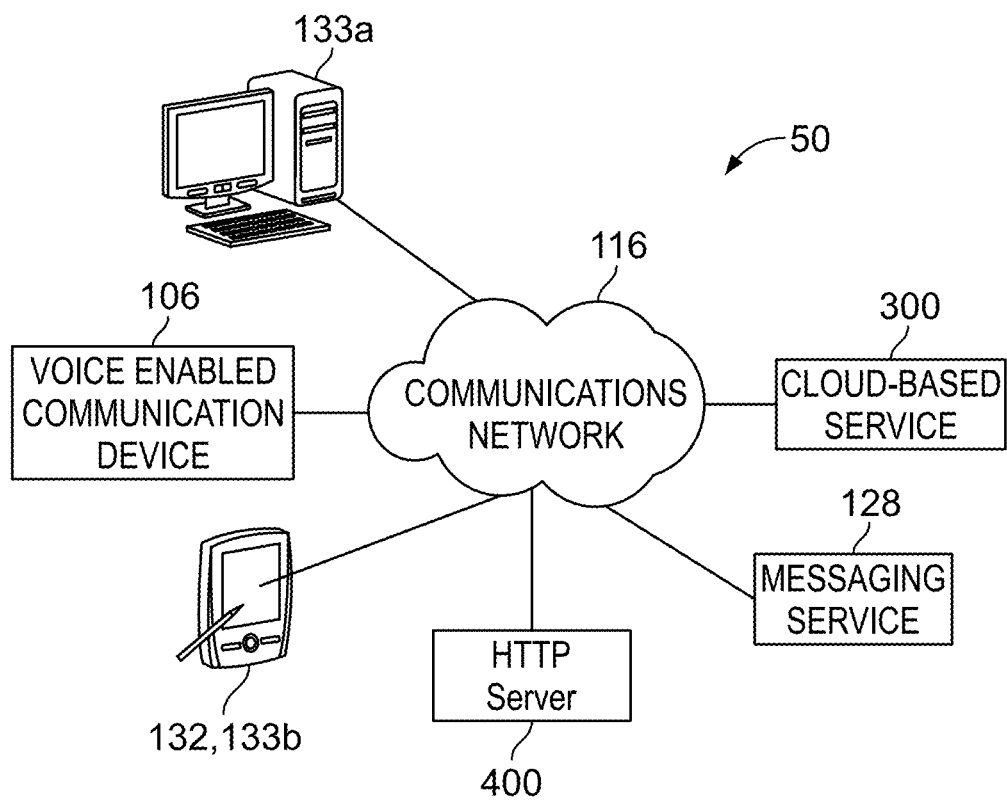
FIG. 3 shows a block diagram an exemplary network communications environment in which the present invention may be employed.

FIG. 3 illustrates an exemplary network communications environment 50 in which the present invention may be implemented. The network communications environment 50 includes a VECD 106, such as an Amazon Alexa device. In accordance with the present invention, a user may speak a command to the VECD 106, e.g., during a voice-enabled interaction/communication session between the user and the VECD 106, to initiate shifting away from the voice-enabled communication session using the voice-enabled communication platform of the VECD to another (non-voice) communications session using another (non-voice) communications platform (such as an SMS and/or HTTP communications session), as discussed above. For example, as part of the platform shifting in accordance with the present invention the user may be prompted by the VECD 106 (in response to initiation of a platform shifting) to provide voice input of a telephone number for receiving a text-type communication via a smartphone 132 or tablet-type 133*b* WED, or to provide voice input of an e-mail address for receiving an e-mail-type communication via a personal computer 133*a*, or an iMessage-type communication via the smartphone 132 or tablet-type 133*b* WED.

Figure 6:
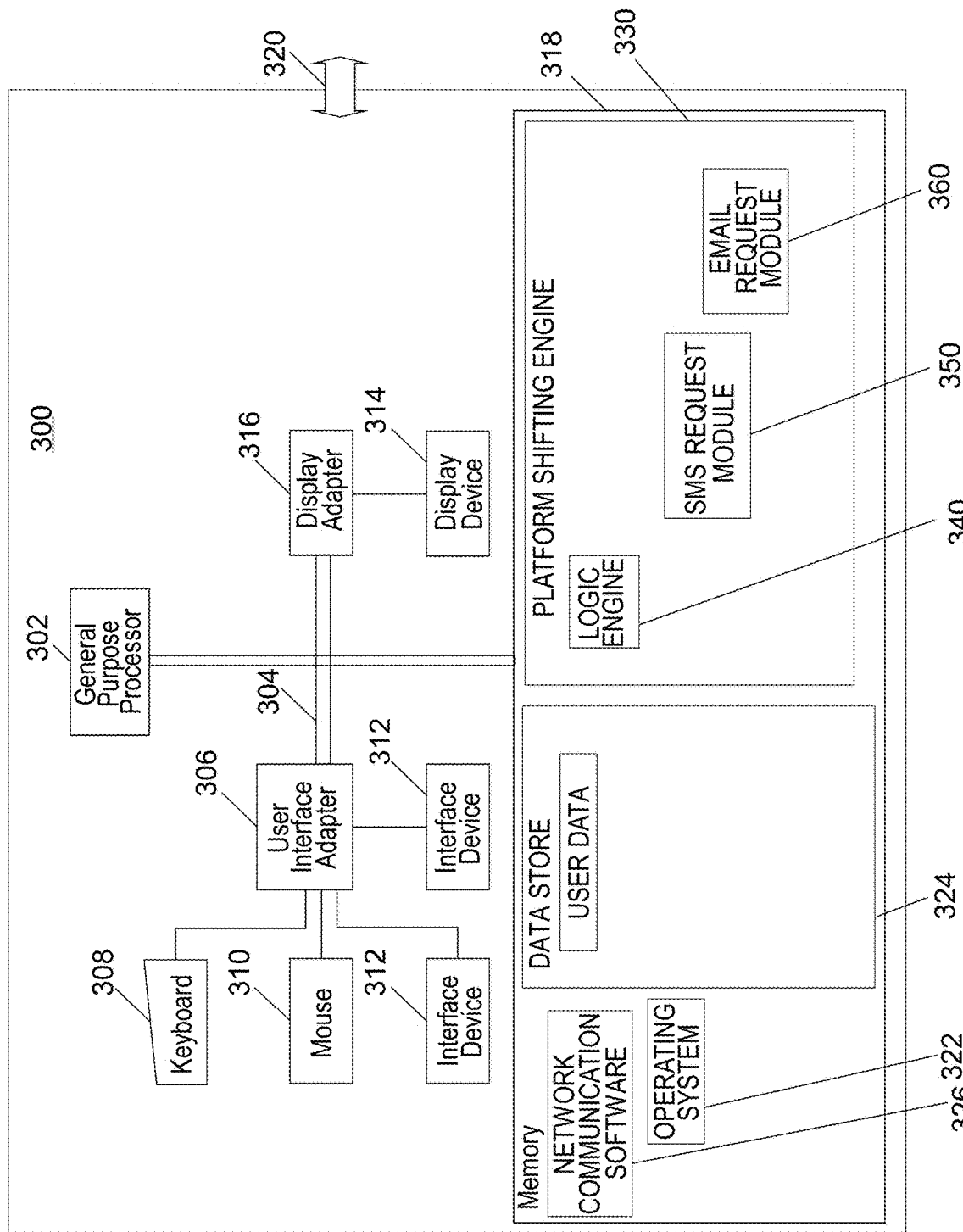
FIG. 6 is a schematic diagram of an exemplary special-purpose Platform Shifting System computing device in accordance with an exemplary embodiment of the present invention.

A cloud-based service 301, which may be implemented by a Platform Shifting System (PSS) 300 as part of remote computing resources 114, receives inputs responsive to the user's platform shifting input (e.g., telephone number or e-mail address) via the VECD 106. FIG. 6 is a block diagram showing an exemplary Platform Shifting System (PSS) 300 in accordance with an exemplary embodiment of the present invention. The exemplary PSS 300 includes conventional computing hardware storing and executing both conventional software enabling operation of a general purpose computing system, such as operating system software 322, network communications software 326. Additionally, the PSS 300 stores and executed computer software for carrying out at least one method in accordance with the present invention. By way of example, the communications software 326 may include conventional web server software, and the operating system software 322 may include iOS, Android, Windows, Linux software.

Accordingly, the exemplary PSS 300 of FIG. 6 includes a general-purpose processor, such as a microprocessor (CPU), 302 and a bus 304 employed to connect and enable communication between the processor 302 and the components of the presentation system in accordance with known techniques. The exemplary PSS 300 includes a user interface adapter 306, which connects the processor 302 via the bus 304 to one or more interface devices, such as a keyboard 308, mouse 310, and/or other interface devices 312, which can be any user interface device, such as a camera, microphone, touch sensitive screen, digitized entry pad, etc. The bus 304 also connects a display device 314, such as an LCD screen or monitor, to the processor 302 via a display adapter 316. The bus 304 also connects the processor 302 to memory 318, which can include a hard drive, diskette drive, tape drive, etc.

The PSS 300 may communicate with other computers or networks of computers, for example via a communications channel, network card or modem 320. The PSS 300 may be associated with such other computers in a local area network (LAN) or a wide area network (WAN), and may operate as a server in a client/server arrangement with another computer, etc. Such configurations, as well as the appropriate communications hardware and software, are known in the art.

The PSS 300 includes computer-readable, processor-executable instructions stored in the memory 318 for carrying out the methods described herein. Further, the memory 318 stores certain data, e.g. in one or more databases or other data stores 324 shown logically in FIG. 6 for illustrative purposes, without regard to any particular embodiment in one or more hardware or software components.

Further, as will be noted from FIG. 6, the PSS 300 includes, in accordance with the present invention, a Platform Shifting Engine (PSE) 330, shown schematically as stored in the memory 318, which includes a number of modules providing functionality in accordance with the present invention, as discussed in greater detail below. These modules may be implemented primarily by software including microprocessor-executable instructions stored in the memory 318 of the PSS 300. Optionally, other software may be stored in the memory 318 and and/or other data may be stored in the data store 324 or memory 318.

The cloud-based service 301 (e.g., PSS 300) manages the platform shifting process by sending a message for initiating a communication session via a separate communications platform. More particularly, the PSE 330 includes a Logic Engine 340, as shown in FIG. 6. The Logic Engine 340 is responsible for receiving an indication of intent to perform platform shifting (originally entered via a VECD using a voice-based interface) to a non-voice-based interface, according to predetermined logic. For example, the Logic Engine 340 may receive an indication of a desire to shift to a web-based platform. The Logic Engine 340 may communication with the Remote Computing Resources 114 to cause a voice prompt to be delivered via the VECD 106 to gather additional information required to shift the session to another communications platform, such as a telephone number of e-mail address for sending a hyperlink. The Logic Engine may have predefined logic or settings determining the appropriate hyperlink/URL/payload, and it may be status or may contextually-aware or otherwise infer it or determine it from information received via the VECD 106 or the remote computing resources 114.

When a response is received at the PSS 300, Logic Engine 340 parses the received data or otherwise determines where/how the user wants to receive a link for continuing the communications session. If the Logic Engine 340 determines that the user desires to receive a hyperlink via a text/SMS message, it causes an SMS Request Module 350 of the PSS 300 (as shown in FIG. 6) to send a suitable hyperlink via SMS message using the telephone number identified by the Logic Engine 340, e.g., by parsing data received at the PSS 300. For example, cloud-based service 301 (SMS Request Module 350 of PSS 300) may submit a request with an endpoint (e.g., telephone number) and payload to the messaging service 128 that will propagate to the endpoint device (e.g., smartphone) by way of an existing communications delivery pipeline (e.g., cell carrier). For example, this may be sent in the form of a REST (HTTP-based) request/API, which may be developed, managed, and maintained by the messaging service 128. The messaging service 128 may then send an SMS/MMS message to the user's smartphone 132 or tablet 133b. The message includes a hyperlink/URL that the user can select to initiate a web-based (e.g., HTTP-based) communication session that is separate from the voice-enabled communication session via the VECD 106, so that the user can provide additional input other than as voice input, and/or so that stored data can be retrieved from the user's device 132/133b, and/or so that a secure communication session (e.g., HTTPS session) can be used to continue communications and information exchange in an HTTP-based session with an HTTP server 400.

By way of alternative example, and somewhat similarly, if the Logic Engine 340 determines that the user desires to receive a hyperlink via an e-mail message, it causes an HTTP Session Module 360 of PSS 300 (as shown in FIG. 6) to send a suitable hyperlink via an e-mail or other message using the e-mail address identified by the Logic Engine 340, e.g., by parsing data received at the PSS 300. For example, cloud-based service 301 (the HTTP Session Module 260) may submit an e-mail address to a messaging service (e.g., cell carrier) 128. For example, the e-mail address may be used by the messaging service 128 to send an iMessage-type message to a user's smartphone 132 or tablet 133b, or to send an e-mail message to the user's personal computer 132/mail client (or a mail client of the user's smartphone 132 or tablet 133b). In any case, the message includes a hyperlink/URL that the user can select to initiate a web-based (e.g., HTTP-based) communication session that is separate from the voice-enabled communication session via the VECD 106, so that the user can provide additional input other than as voice input, and/or so that stored data can be retrieved from the user's device 132/133b, and/or so that a secure communication session (e.g., HTTPS session) can be used to continue communications and information exchange in an HTTP-based session with an HTTP server 400.

Figure 4:
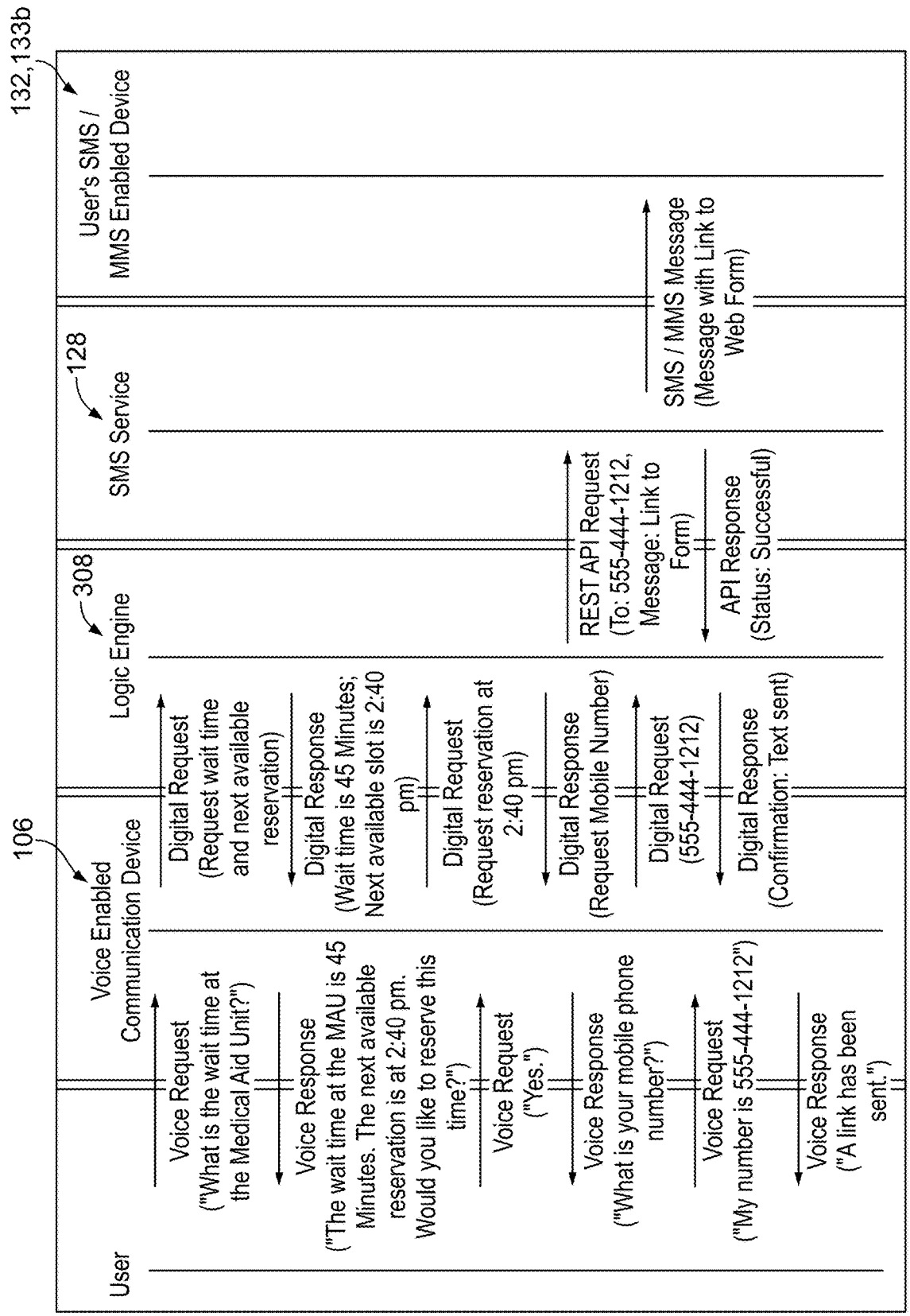
FIG. 4 shows a block diagram of exemplary communication flows among components of the system.
Figure 5:
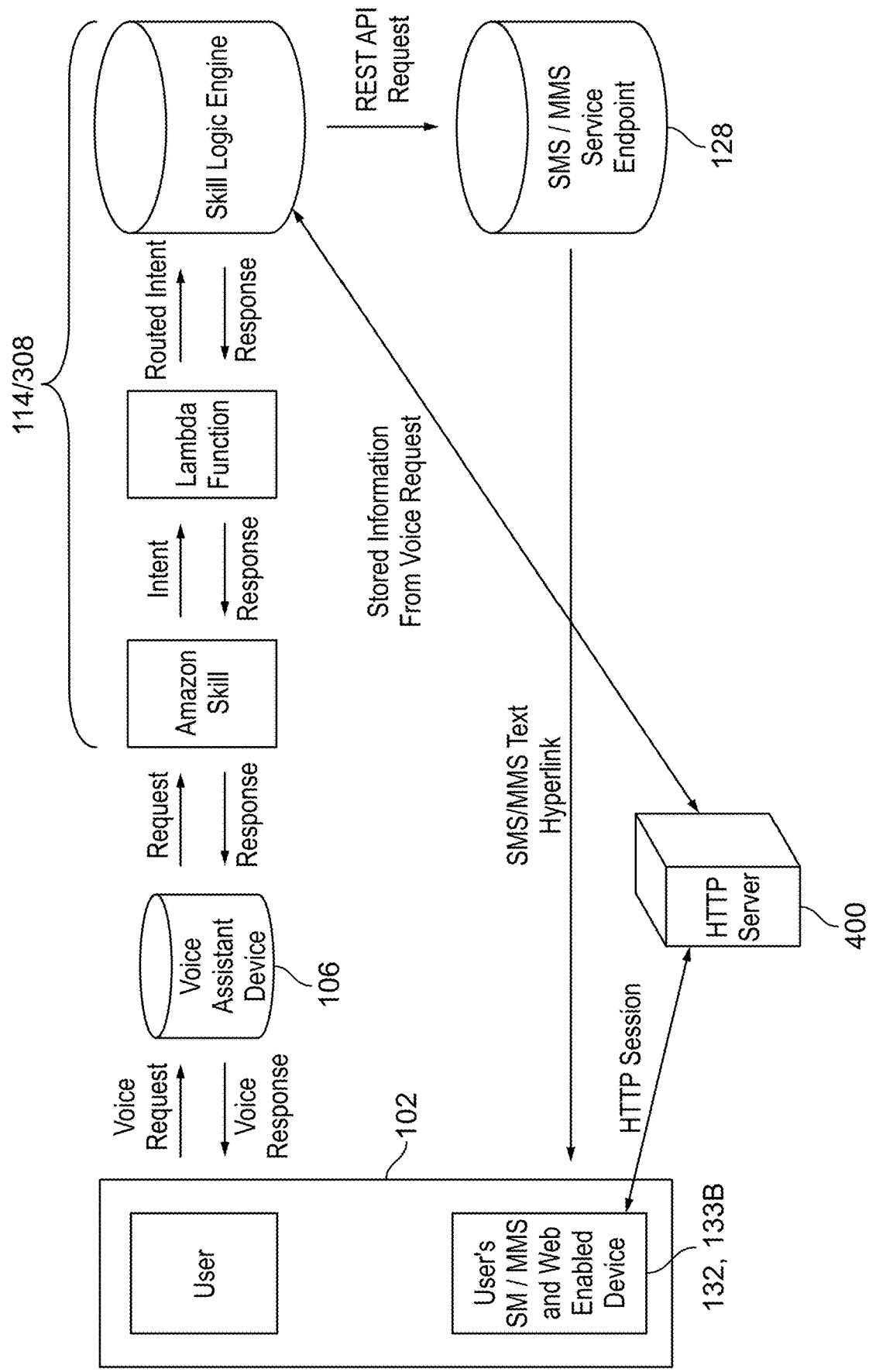
FIG. 5 shows an illustrative process of interaction among components of the system.

Additional information illustrating exemplary communications for communication session shifting from a voice-enabled communication platform to a web-enabled communication platform is shown in FIGS. 4 and 5.

The link/URL may be generated and/or specified as managed by the cloud-based service 301. For example, if the request to switch to the web platform was received during a workflow for making an appointment at a healthcare facility, then the cloud-based service 301 may send a link to a web-based form on a web-page that allows for making of an appointment at that particular healthcare facility. Such forms provide for receipt of input as text-based input (e.g., via keyboard or touchscreen) rather than as voice input, so that input will not be spoken and overheard by others in proximity to the user, and so that unusual surnames, town names, etc. can be captured accurately without errors introduced in a voice recognition process. Additionally, data elements required for completion of the form may be retrieved from a cache and/or data store of information stored at the user's device, or elsewhere. This allows for forms to be completed particularly efficiently, e.g., without re-entering previously provided input, which can be pre-populated or automatically populated from stored data, as known in the art. Additionally, the link may be sent to use the secure HTTPS protocol, to allow for encrypted/secure data communications, to preserve data privacy, as will be appreciated by those skilled in the art.

The processes described herein may be implemented by the architectures described herein, or by other architectures. These processes are illustrated as collections of blocks in logical flow graphs. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

It will be appreciated by those skilled in the art that there are numerous commercial applications for this platform switching application that allows a user to complete complex information exchange interactions started via a voice interface in a secure and practical format. By way of example, a user could select an appointment time via a voice interaction with the VECD, provide a mobile telephone number, be texted a hyperlink to a secure web form, and then complete a registration via textual input in an HTTP/HTTP communication session. Alternatively, a user could select from a menu of items and create an order using voice commands and the VECD, then provide a mobile telephone number and be texted a hyperlink to a secure HTTPS web form to complete the order and make payment, or to complete a banking transaction. By way of further example, a user could inquire about how to get to a specific location via a voice interaction with the VECD, provide a mobile phone number as part of a platform shifting request, and then get texted a hyperlink/URL to directions, a map, or an image.

In certain embodiments, the hyperlink/text/message could include a data payload sent to the user during the interaction. The payload could comprise directions, a form to complete purchasing movie tickets, a picture, a recording, a song, a video, etc.

Accordingly, the present invention allows a user to take full advantage of a voice-enabled communication device to start an interaction, and then seamlessly switch the interaction to a different (web-based) platform for enhances ease of use and security to complete the interaction. This is done by having a user provide a spoken mobile phone number, e.g., at a point during an interaction when use of voice commands becomes undesirably cumbersome or a barrier (providing registration information, completing a purchase, receiving complex directions that need to be saved, receiving a coupon, etc.).

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A computer-implemented method for shifting an information exchange session to another data communications platform using a computerized platform shifting system having at least one processor and a memory operatively coupled to the at least one processor and storing instructions executable by the processor, the method comprising:

receiving a request to shift communications away from a voice-enabled communications platform of a voice-enabled communications device configured to detect vocal input within a physical environment of the voice-enabled communications device; and sending, from the platform shifting system, a message to a messaging address, the message comprising a URL for initiating a web-based communication session with any web-enabled communication device.

2. The method of claim 1, wherein the request comprises a messaging address for communication via a text-based communications platform.

3. The method of claim 2, wherein the messaging address comprises an e-mail address.

4. The method of claim 1, wherein the messaging address comprises a telephone number.

5. The method of claim 1, wherein sending the message comprises sending of at least one of an SMS message and an MMS message.

6. The method of claim 3, wherein sending the message comprises sending an e-mail message to the e-mail address.

7. The method of claim 3, wherein sending the message comprises sending an MMS message to the e-mail address.

8. The method of claim 1, wherein the message comprises a hyperlink to a web address.

9. The method of claim 8, wherein the URL is configured for use of HTTP data communications protocol.

10. The method of claim 8, wherein the URL is configured for use of HTTPS data communications protocol.

11. The method of claim 1, wherein the messaging address comprises a mobile telephone number.

12. The method of claim 11, wherein sending the message comprises sending an SMS message to the telephone number.

13. The method of claim 11, wherein sending the message comprises sending an MMS message to the telephone number.

14. The method of claim 11, wherein the URL comprises a web address.

15. The method of claim 14, wherein the URL is configured for use of HTTP data communications protocol.

16. The method of claim 14, wherein the URL is configured for use of HTTPS data communications protocol.

17. The method of claim 1, wherein receiving the request comprises receipt at the voice-enabled communications device of vocal input identifying the messaging address.

18. The method of claim 1, wherein receiving the request comprises receiving, at the platform shifting system, a data communication corresponding to vocal input provided to the voice-enabled communications device.

19. The method of claim 1, wherein the message is sent to the messaging address in the form of a REST API request.

20. The method of claim 1, wherein the message is sent to a messaging gateway server.

21. The method of claim 1, wherein the request identifies an endpoint and contains a data payload.

22. The method of claim 21, wherein the URL comprises at least a portion of the data payload formatted for use in the web-enabled communication session.

23. The method of claim 22, wherein the portion of the data payload is used to prepopulate a form in an HTTP communication session.

24. The computer-implemented method of claim 1, wherein said instructions are configured to send the message to a messaging address associated-with a particular web-enabled communication device.

25. A platform shifting system comprising:

a processor;

a memory operatively connected to the processor, said memory storing executable instructions that, when executed by the processor, causes the platform shifting system to perform a method for shifting an information exchange session to another data communications platform, the method comprising:

receiving a request to shift communications away from a voice-enabled communications platform of a voice-enabled communications device configured to detect vocal input within a physical environment of the voice-enabled communications device; and sending, from the platform shifting system, a message comprising a generic URL for initiating a web-based communication session with any web-enabled device.

26. A computer program product for implementing a method for shifting an information exchange session to another data communications platform, the computer program product comprising a non-transitory computer-readable medium storing executable instructions that, when executed by a processor, cause a computerized system to perform the method for shifting the information exchange session to another data communications platform, the method comprising:

receiving a request to shift communications away from a voice-enabled communications platform of a voice-enabled communications device configured to detect vocal input within a physical environment of the voice-enabled communications device; and sending, from the platform shifting system, a message comprising a URL for initiating a web-based communication session with any web-enabled communication device.

* * * * *